_United States Patent_ [19]

Thompson

[11] Patent Number: 4,633,610

[45] Date of Patent: Jan. 6, 1987

[54] SMALL ANIMAL TRAP

[76] Inventor: Robert R. Thompson, 613 State St., Ackley, Iowa 50601

[21] Appl. No.: 729,918

[22] Filed: May 3, 1985

[51] Int. Cl.$^4$ ............................................. A01M 23/00
[52] U.S. Cl. ............................................. 43/85; 43/61; 43/77; 43/81
[58] Field of Search .................... 43/85, 58, 61, 77, 78, 43/80, 81, 82

[56] References Cited

U.S. PATENT DOCUMENTS

| | | | |
|---|---|---|---|
| 1,989,174 | 1/1935 | Schwenk | 43/85 |
| 2,120,812 | 6/1938 | Rinaldy | 43/85 |
| 2,222,653 | 11/1940 | Chambless | 43/85 |
| 2,460,417 | 2/1949 | Goostrey | 43/85 |
| 2,752,723 | 7/1956 | Lutsky | 43/85 |
| 3,417,504 | 12/1968 | Anderson | 43/85 |
| 3,530,613 | 9/1970 | Brubakken | 43/85 |
| 4,158,929 | 6/1979 | Custard | 43/61 |
| 4,306,370 | 12/1981 | Lindblad | 43/82 |
| 4,569,149 | 2/1986 | Sensing | 43/61 |
| 4,578,893 | 4/1986 | Wickenberg | 43/77 |

_Primary Examiner_—Nicholas P. Godici
_Assistant Examiner_—Kurt Rowan
_Attorney, Agent, or Firm_—G. Brian Pingel; Kent A. Herink

[57] ABSTRACT

A trap assembly for capturing small animals formed from a housing that encloses a jaw assembly for grasping the paw or leg of the animals. The jaw assembly is formed from a trap plate having an aperture and a resiliently biased arm that is movable from an open position to a closed position where it coacts with side edges of the plate aperture to form a pair of jaws for grasping the animal.

9 Claims, 5 Drawing Figures

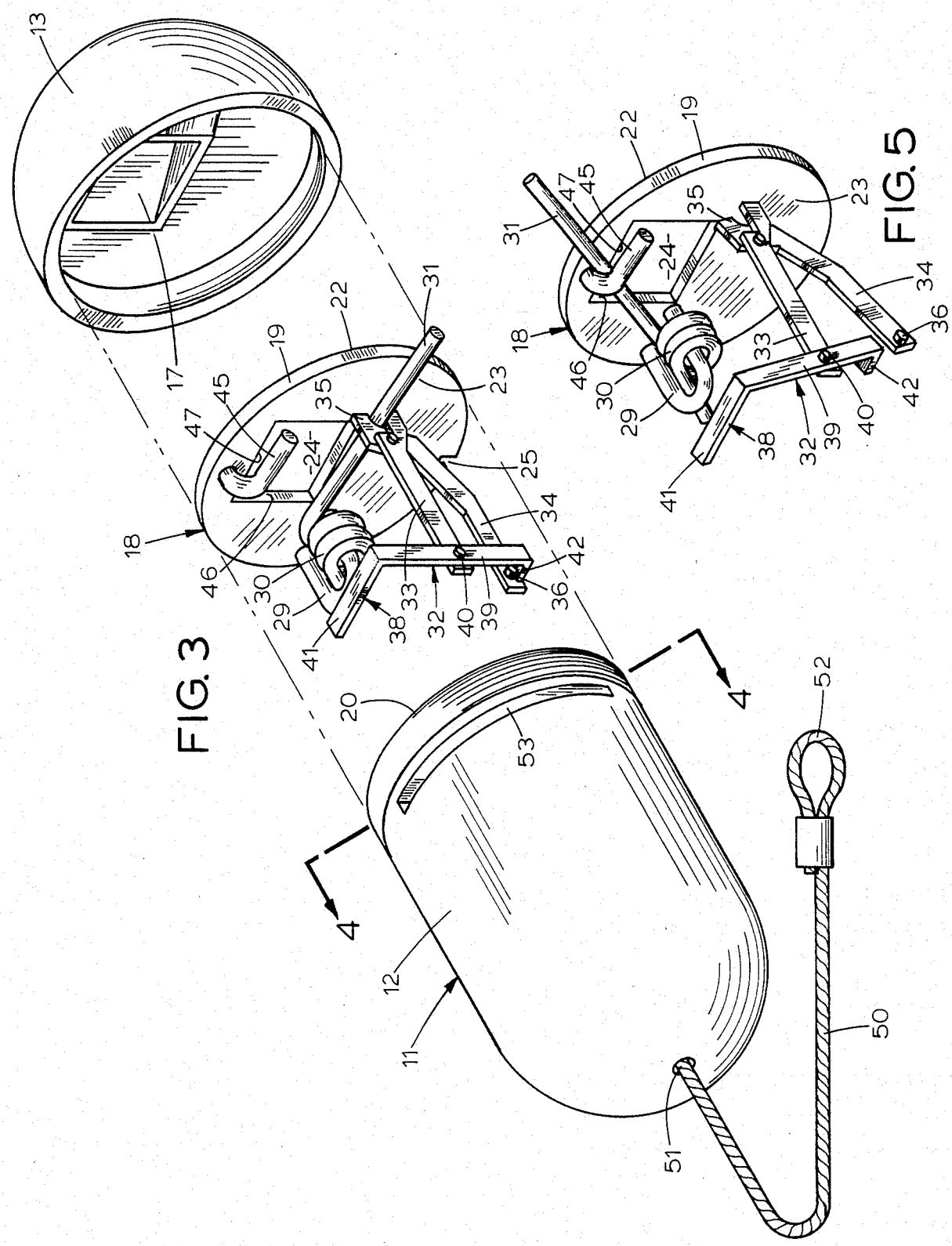

4,633,610

SMALL ANIMAL TRAP

BACKGROUND OF THE INVENTION

1. Field of the Invention

The present invention relates in general to a trap for catching small animals and more specifically to such traps that have a shield about the jaw portions of the trap.

2. Description of the Prior Art

Normal spring traps that have their jaws exposed to the animal they trap do not operate effectively in trapping small animals such as raccoons or the like. If a raccoon is caught in such a trap and has the time to do so, it will chew off the trapped portion of its leg and escape. The reason a raccoon is able to do this is because the portion of the leg trapped by the jaws becomes numb. As the animal chews at the trap in an attempt to gain its release, it chews on its limb without realizing what it is doing.

There has been an attempt by at least one manufacturer to produce a trap that will prevent chew-out by a trapped animal. This trap is produced by D. P. Trap Company and consists of a small rectangularly-shaped box having an inlet opening on one of the long, narrow sides of the box. Bait is placed inside the box in association with a trigger mechanism that is triggered by the animal reaching for the bait to close the inlet opening. The bait is placed in such a position that the animal has to reach its entire paw and a portion of its leg inside the trap and when the spring mechanism is released, the entry hole is restricted to maintain the paw and leg inside the trap.

Although the above trap appears to be an improvement over normal spring trap mechanisms, it still suffers from several disadvantages. In the first place, the jaw mechanism is not readily removable from the trap, if its removable at all, and, therefore, such trap is probably not usable for prebaiting prior to the opening of the hunting season for the small animals desired. Secondly, it seems that under certain situations, it would still be possible for the animal to chew-out from the trap.

The present invention provides a small animal trap that is relatively simplistic in construction but yet overcomes the disadvantages described above.

SUMMARY OF THE INVENTION

The present invention provides a trap assembly for capturing small animals or the like and includes a two-piece housing in which a jaw means is secured. The housing has an inlet opening in one end sufficient in size to permit an animal to stick one of its paws and associated leg into the housing. The jaw means is removably secured inside of the housing and is designed to be actuated by the animal to grasp its paw or leg.

The jaw means is formed of a trap plate with an aperture and is interposed between the ends of the housing. A resilient means is attached to the trap plate and is associated with an arm that is movable by the resilient means from an open position unrestricting the aperture to a closed position restricting the aperture whereby said arm and a portion of said aperture serve as coacting jaws. The jaw means further includes a trigger means that is operable by an animal and is mounted on the trap plate for releasably securing said arm in a set position.

Preferably the housing is formed from a lightweight, durable plastic which permits a user to carry a plurality of the trap assemblies into remote areas. Because of the location of the jaw means within the housing there is little likelihood that nontargeted animals, such as dogs and cats, will be caught, and the shape and color of the assembly can be an additional factor in attracting targeted animals.

The invention will appear more clearly from the following detailed description when taken in connection with the accompanying drawings, showing by way of example a preferred embodiment of the inventive idea wherein like numerals refer to like parts throughout.

BRIEF DESCRIPTION OF THE DRAWINGS

FIG. 3 is an exploded side perspective view of the trap assembly of FIG. 1 showing two half portions of the trap housing and a jaw assembly that is enclosed within the housing.

FIG. 5 is a perspective view of the jaw assembly shown in FIG. 3.

DETAILED DESCRIPTION OF THE INVENTION

Figure 1:
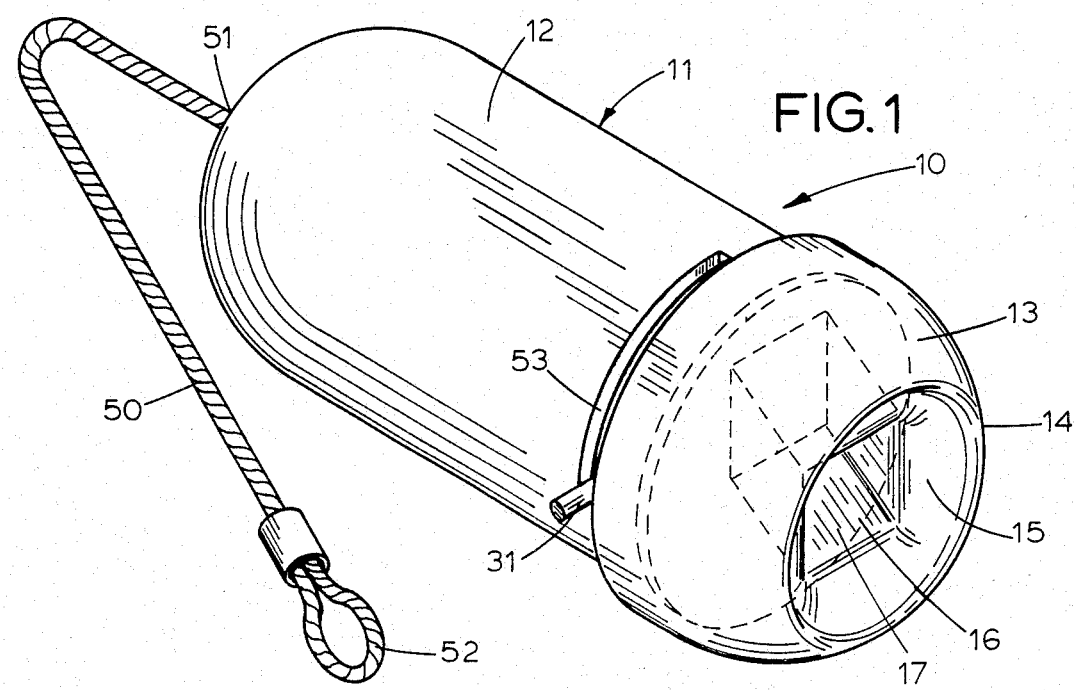
FIG. 1 is a front side perspective view of a preferred embodiment of a trap assembly of the present invention.

Referring now to the drawings and with reference first to FIG. 1, a trap assembly of the present invention is shown generally at 10. The trap assembly 10 is particularly advantageous for trapping raccoons, but may be used in certain instances for other small animals. The trap assembly 10 preferably includes an oblong-shaped housing 11 formed from a relatively rigid, durable, lightweight polyethylene plastic material or the like. The housing 11 has two parts, 12 and 13, with the circumference of the part 12 being slightly smaller than that of the part 13 so that an end portion of the part 12 may be received within an end portion of the part 13 and secured thereto by a threaded attachment configuration or by screws or other fastening means. It should be recognized by those skilled in the art a wide variety of means may be used for connecting the parts 12 and 13 together and that the use of threads is only for purposes of illustration.

Figure 2:
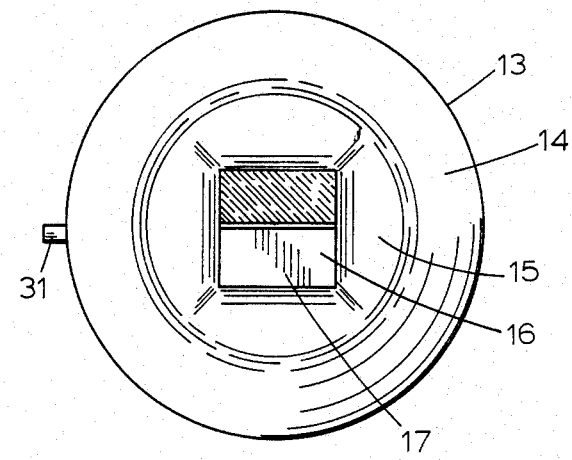
FIG. 2 is a front end view in elevation of the trap assembly of FIG. 1.

As shown in both FIGS. 1 and 2, the part 13 includes a rounded end 14 having a concaved depression 15 that leads to an inlet opening 16 preferably of a square shape. The interior of the part 13 includes a guide channel 17 that leads on an incline from the inlet opening 16. The guide channel 17 may be formed by having the housing part 13 of solid configuration with the guide channel 17 being formed therein or the guide channel 17 may be of a molded configuration. Preferably, the shape of the guide channel 17 in cross section conforms substantially to the shape of the inlet opening 16.

Figure 4:
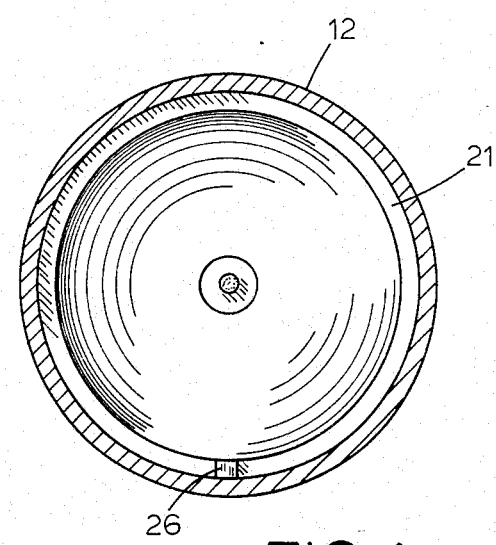
FIG. 4 is a sectional view taken along the line 4—4 of FIG. 3.

As indicated in FIG. 3, a jaw assembly 18 is normally positioned within the housing 11 and includes a disk shaped trap plate 19 preferably made from metal. The trap plate 19 has a circumference that is slightly smaller than an open end 20 of the part 12 and is receivable therein to abut against an interior flange 21 (FIG. 4) spaced approximately ½ inch from the open end 20. Thus, the flange 21 serves to limit the amount of insertion of the trap plate 19 into the housing part 12. The jaw assembly 18 may be secured in position within the housing part 12 by retaining nibs, spring clamps or other such retaining means (not shown) as are well known in the art.

Referring again to FIG. 3, the trap plate 19 has a front side 22 that faces the guide channel 17 and a rear side 23 that faces away from such channel. Cut in the upper half of the plate 19 is an aperture 24 that is preferably square in shape conforming to the dimensions of the guide channel 17 and preferably the channel 17 extends from the inlet opening 16 to the aperture 24. A notch 25 is also cut in the trap plate 19 that coacts with a key 26 on the interior flange of the housing part 12 to serve as an alignment means to align the aperture 24 with the guide channel 17 and also to prevent the trap plate 19 from being turned within the housing 11.

Mounted on an inverted U-shaped post 29 on the rear side 23 of the trap plate 19 in an outwardly projecting position adjacent one side of the aperture 24 is a coil spring 30. Preferably, one end of the coil spring 30 terminates in a straight arm portion 31 that extends radially outward from the spring 30. However, it is not essential that the arm 31 be an integral part of the coil 30 and instead the arm 31 may merely be biased by the coil spring 30. The length of the arm 31 must be sufficient to extend across the aperture 24 and is movable from a rest position, as shown in FIG. 5, in a plane parallel to the trap plate 19 in a clockwise direction to place the coil spring 30 under tension, as shown in FIG. 3.

When the arm 31 is moved clockwise from its rest position, it sweeps across the aperture 24 into a set position as shown in FIG. 3 completely unblocking the aperture 24. The arm 31 is held in this position when the trap plate is set by a trigger means 32. Included as part of the trigger means 32 is a support arm 33 welded at one end to the trip plate rear side 23 to extend outwardly therefrom. Pivotally attached to a lower portion of the support arm 33 is a rockable latch arm 34 with a latch finger 35 at one end that serves as a keeper for the spring arm 31 when the jaw assembly is in a set condition. The opposite, upper end of the latch arm 34 has a trigger node 36. Also pivotally attached to the support arm 33 is a trigger arm 38 generally formed in a right angle configuration. The arm 38 has a first straight leg 39 pivotally attached to the support arm 33 at 40 and a second straight leg portion 41 that is orthogonal to the leg 39 to be in alignment with the aperture 24.

At its free end, the leg 39 has a short flange portion 42. As shown in FIG. 3, when the jaw assembly 18 is in a set condition, the flange 42 engages the node 36 on the latch arm 34 to hold the arm 34 in a set condition with the latch finger 35 retaining the spring arm 31. However, when the trigger arm 38 is rotated to release the engagement of the node 36 from the flange 42, the tension of the coil spring 30 causes the spring arm 31 to pivot the latch arm 34 to lift the finger 35 to permit the spring arm 31 to move counterclockwise to sweep across the rear side 23 of the trap plate 19 and form a jaw means with the sides of the aperture 24. Preferably, there is a motion of limit abutment 45 mounted on the side of the aperture 24 opposite the coil spring 30 that limits the amount of counterclockwise movement of the spring arm 31 when it is released.

It should be readily apparent to those skilled in the art that the trigger means 32 is designed to be actuated by an animal when it sticks its paw and leg through the inlet opening 16, the guide channel 17 and the aperture 24 to reach bait stored in the housing part 12. Thus, when the trigger means 32 is actuated by an animal, the spring arm 31 will move to its closed position against the abutment 45 to trap the paw or leg of the animal against the side edges 46 and 47 of the aperture 24. In this way, the spring arm 31 and aperture side edges 46 and 47 serve as coacting jaw members to grasp the animal and hold it.

There are a number of advantages provided by the invention as described above. In the first place, by having the spring arm 31 serve as one of the coacting jaw members, a resiliently biased jaw means is formed that is less likely to cut through the paw or leg of the animal. Secondly, because the animal's paw or leg is trapped inside of the housing 11, the actual point of entrapment is shielded from the animal to prevent chewing-out and escape by the animal. Thirdly, the rounded configuration of the housing 11 reduces the likelihood that the animal will be able to attack and chew through the housing in an attempt to gain its release.

In addition to the above advantages, it should be noted that the present invention is particularly adapted for gaining an animal's confidence before it is trapped. This is done through a conditioning period prior to the opening of the trapping season. Because the jaw assembly 18 is removably secured within the housing 11, it can readily be removed therefrom. Then the housing part 12 of the trap assembly 10 is filled with bait and staked out at a desirable trapping location. Preferably a steel cable 50 has an end 51 secured in the housing 11 and an opposite free end 52 that may be staked to the ground. In this way, animals become familiar with seeing the trap assembly and removing bait from it without the jaw assembly in place. Once the trapping season opens, it is then a simple process to reinsert and set the jaw assembly 18 so that the trap assembly 10 is placed in an operating condition.

To facilitate removal of an animal once it is trapped, the housing part 12 includes a slot 53 radially in line with the spring arm 31 throughout its movement of travel. Also, as shown in FIG. 1, the spring arm 31 should be of sufficient length that it extends through the slot 53. Thus, once an animal is caught in the assembly 10, it is a simple process to release the pressure on the trapped portion of the animal by grasping the end of the spring arm 31 and rotating it out of its closed position.

I claim:

1. A trap assembly for capturing a small animal comprising:
   a. a housing having an inlet opening in one end sized to permit said animal to stick one of its paws and associated leg into said housing;
   b. jaw means secured inside of said housing and having:
      1. a trap plate having an aperture and being interposed between the ends of the housing;
      2. an arm movable from a set position unrestricting said aperture to a closed position whereby said arm and a portion of the side edges of said aperture serve as coacting jaws to grasp the paw or leg of said animal;
      3. resilient means within said housing and attached to said trap plate for moving said arm from said set position to said closed position;
      4. trigger means operable by said animal and mounted on said plate for releasably securing said arm in said set position;
   c. means for gaining access to the interior of said housing to set said trigger means in its releasably securing condition; and d. said inlet opening of said housing is formed in a curved portion of the housing to make it more difficult for said animal to chew on the housing.

2. A trap assembly for capturing a small animal comprising:
   a. an oblong-shaped housing having an inlet opening in one end sized to permit said animal to stick one of its paws and associated leg into said housing;
   b. jaw means secured inside of said housing, said jaw means having;
      1. a trap plate having an aperture and being interposed between the ends of the housing with one side of said plate facing said housing opening and the opposite side of said plate facing away from said opening;
      2. resilient means attached to said opposite side of said plate;
      3. a trap arm associated with said resilient means and movable thereby from an open position unrestricting said aperture to a closed position whereby said arm and at least a portion of the side edge of said aperture to serve as coacting jaws to grasp the paw or leg of said animal;
      4. trigger means operable by said animal and mounted on said opposite side of said trap plate for releasably securing said arm in said open position; and
   c. means for gaining access to the interior of said housing to set said trigger means in its releasably securing condition.

3. A trap assembly as recited in claim 2 wherein said housing further includes means forming a passage from said inlet opening to said aperture in said trap plate to guide the paw of said animal through said aperture.

4. A trap assembly as recited in claim 2 wherein said resilient means is formed by a coil spring, one end of which terminates in a straight portion that serves as said trap arm.

5. A trap assembly as recited in claim 2 wherein said aperture is square-shaped whereby one of said coacting jaws is formed by portions of two orthogonal side edges of said aperture.

6. A trap assembly as recited in claim 2 wherein said access means is provided by forming the housing in two parts releasably secured together.

7. A trap assembly as recited in claim 6 wherein said jaw means is releasably secured inside of said housing and is removable therefrom.

8. A trap assembly as recited in claim 5 wherein said trigger means is operable by one of a pulling action and a pushing action by said animal.

9. A trap assembly for capturing a small animal comprising:
   a. a housing having an inlet opening in one end end sized to permit said animal to stick one of its paws and associated leg into said housing;
   b. jaw means secured inside of said housing, said jaw means having:
      1. a trap plate interposed between the ends of the housing with one side of said plate facing said housing opening and the opposite side of said plate facing away from said opening;
      2. resilient means attached to said opposite side of said plate;
      3. a trap arm associated with said resilient means and movable thereby from an open position unrestricting said aperture to a closed position whereby said arm and at least a portion of the side edge of said aperture to serve as coacting jaws to grasp the paw or leg of said animal;
      4. trigger means operable by said animal and mounted on said opposite side of said trap plate for releasably securing said arm in said open position; and
   c. means for gaining access to the interior of said housing to set said trigger means in its releasably securing condition.

* * * * *